US012769190B2

(12) United States Patent
Sato

(10) Patent No.: US 12,769,190 B2
(45) Date of Patent: Oct. 20, 2026

(54) IMAGE PICKUP APPARATUS AND CAMERA SYSTEM HAVING THE SAME

(71) Applicant: CANON KABUSHIKI KAISHA, Tokyo (JP)

(72) Inventor: Hideki Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 19/059,768

(22) Filed: Feb. 21, 2025

(65) Prior Publication Data

US 2025/0278013 A1 Sep. 4, 2025

(30) Foreign Application Priority Data

Mar. 4, 2024 (JP) ................................ 2024-031873

(51) Int. Cl.

*G03B 17/55* (2021.01)
*G03B 17/56* (2021.01)
*H04N 23/51* (2023.01)
*H04N 23/52* (2023.01)

(52) U.S. Cl.

CPC ........... *G03B 17/55* (2013.01); *G03B 17/566* (2013.01); *H04N 23/51* (2023.01); *H04N 23/52* (2023.01); *G03B 17/563* (2013.01)

(58) Field of Classification Search

CPC .... G03B 17/55; G03B 17/566; G03B 17/563; H04N 23/51; H04N 23/52

See application file for complete search history.

(56) References Cited

U.S. PATENT DOCUMENTS 11,711,603 B1 * 7/2023 Santos ................. H04N 23/663
11,927,747 B2 * 3/2024 Hong ..................... H04N 23/55

FOREIGN PATENT DOCUMENTS

JP 2012198447 A 10/2012
JP 2019219458 A 12/2019
JP 2023077022 A 6/2023
WO 2022244494 A 11/2022

OTHER PUBLICATIONS

The above foreign patent documents were cited in the Jul. 1, 2025 Japanese Office Action, which is enclosed without an English Translation, that issued in Japanese Patent Application No. 2024-031873.

* cited by examiner

*Primary Examiner* — Lin Ye
*Assistant Examiner* — Fayez A Bhuiyan
(74) *Attorney, Agent, or Firm* — Cowan, Liebowitz & Latman, P.C.

(57) ABSTRACT

An image pickup apparatus to which a cooling apparatus including a fan is detachable includes a heat generating member, a first exterior member that forms a first surface of a housing and has a first opening, a second exterior member that forms a second surface of the housing and has a second opening, a heat radiating member that is arranged inside the housing to face a surface opposite to the first surface and is configured to cool heat generated by the heat generating member, a first sealant arranged between the first exterior member and the heat radiating member, and a second sealant arranged between the first exterior member and the second exterior member, and between the heat radiating member and the second exterior member. The first and second exterior members and the heat radiating member form a first flow path of air between the first and second openings.

11 Claims, 10 Drawing Sheets

IMAGE PICKUP APPARATUS AND CAMERA SYSTEM HAVING THE SAME

BACKGROUND

Technical Field

The present disclosure relates an image pickup apparatus to which a cooling apparatus is detachable.

Description of Related Art

In image pickup apparatuses, the calorific value has increased due to factors such as enhanced functionality leading to greater power consumption and miniaturization of electronic components, and a heat radiating structure has been provided to suppress temperature rise.

Japanese Patent Laid-Open No. 2019-219458 discloses a configuration for cooling the interior and exterior of an image pickup apparatus by forming an inlet port and an exhaust port on the rear cover of the image pickup apparatus, and providing a duct between the rear cover's exterior side and the interior side of a display unit arranged further outward.

Japanese Patent Laid-Open No. 2012-198447 discloses a configuration that includes inlet and exhaust ports leading to the interior of an image pickup apparatus and a fan unit, which, when mounted, creates an airflow within the internal space to enhance portability while cooling the interior and exterior as needed.

However, the configuration of Japanese Patent Laid-Open No. 2019-219458 does not allow a fan unit for directing air through a duct to be detachably mounted, making it impossible to improve cooling performance. Additionally, the arrangement of the inlet port and exhaust port is limited to within the rear cover, resulting in low flexibility in their placement.

In the configuration of Japanese Patent Laid-Open No. 2012-198447, the inlet port of the image pickup apparatus is provided on the tripod mounting means, limiting the placement of the inlet port. Additionally, there is no duct provided inside the image pickup apparatus, causing the air from the fan unit to easily diffuse.

SUMMARY

An image pickup apparatus according to one aspect of the present disclosure is configured with a detachable cooling apparatus including a fan unit. The image pickup apparatus includes a heat generating member, a first exterior member that forms a first surface of a housing and has a first opening, a second exterior member that forms a second surface different from the first surface of the housing and has a second opening, a heat radiating member that is arranged inside the housing to face a surface opposite to the first surface and is configured to cool heat generated by the heat generating member, a first sealant that is arranged between the first exterior member and the heat radiating member, and a second sealant that is arranged between the first exterior member and the second exterior member, and between the heat radiating member and the second exterior member. The first exterior member, the second exterior member, and the heat radiating member form a first flow path of air between the first opening and the second opening. The first sealant is placed in a pressed state between the first exterior member and the heat radiating member. The second sealant is placed in a pressed state between the first exterior member, the second exterior member, and the heat radiating member.

Further features of various embodiments of the disclosure will become apparent from the following description of exemplary embodiments with reference to the attached drawings.

DETAILED DESCRIPTION

Figure 1A:
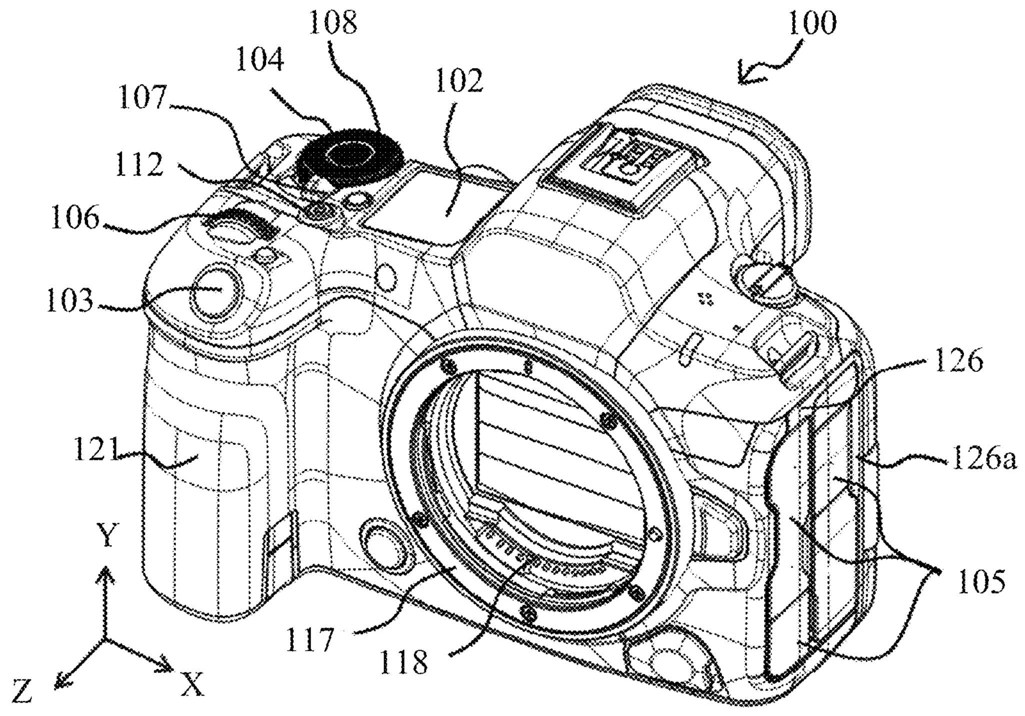
FIGS. 1A and 1B are external views of an image pickup apparatus according to the present embodiment.

Referring now to the accompanying drawings, a detailed description will be given of embodiments according to the disclosure. Corresponding elements in respective figures will be designated by the same reference numerals, and a duplicate description thereof will be omitted.

Figure 1B:
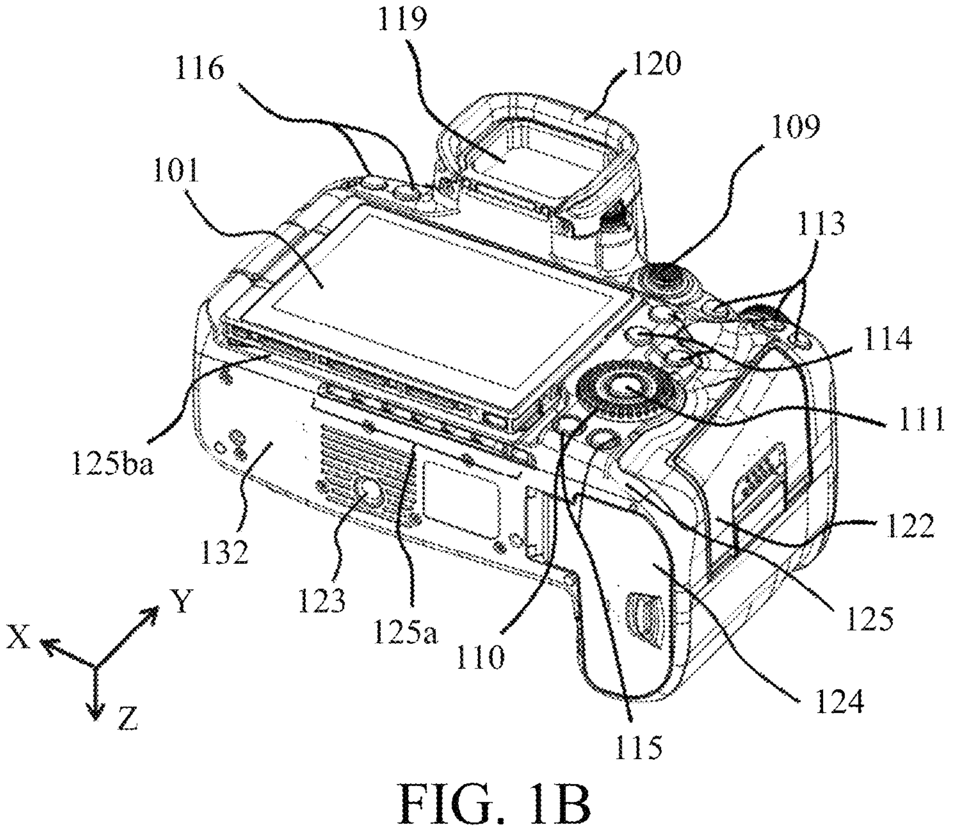

FIGS. 1A and 1B are external views of a camera body 100, which serves as an image pickup apparatus according to the present embodiment. FIG. 1A illustrates the camera body 100 viewed from the front and FIG. 1B illustrates the camera body 100 viewed from the rear. In the present embodiment, the width direction of the camera body 100 is defined as the X direction, the height direction as the Y direction, and the direction perpendicular to the image pickup surface of an image pickup element (described later), corresponding to the optical axis direction of an unillustrated imaging optical system, as the Z direction.

A rear display unit 101 is attached to the rear of the camera body 100, allowing it to be opened, closed, and rotated relative to the camera body 100, and displays images generated by imaging, as well as various types of information related to imaging. The rear display unit 101 is equipped with a touch panel capable of detecting touch operations by a user (photographer) on its display surface (operating surface). An upper display unit 102 is provided on the upper surface of the camera body 100 and is capable of displaying the settings of various imaging parameters, such as shutter speed and aperture.

A shutter button 103 is an operation member that the user operates when instructing the camera body 100 to capture an image. A mode selection switch 104 is an operation member that the user operates when switching between various modes. A terminal cover 105 is a cover that protects a connector capable of connecting to a cable extending from an external device. A main electronic dial 106 is an operation member that the user rotates when changing the setting values of imaging parameters. A power switch 107 is an operation member that the user operates to toggle the power of the camera body 100 ON or OFF. A sub-electronic dial 108 is an operation member that the user operates to move selection frames, such as autofocus (AF) frames, or to scroll through images.

A multi-controller 109 is provided on the rear of the camera body 100 and is configured to allow input through both pressing the key top and tilting it in upward, downward, leftward, rightward, or diagonal directions. By operating the multi-controller 109, the user can move the selection frame or select items from various menus.

A rear electronic dial 110 is an operation member that the user operates to move the selection frame or scroll through images. The rear electronic dial 110 is arranged to allow the user to operate it intuitively while replaying captured images on the rear display unit 101, and it is also conveniently located for operation when the user holds the camera body 100 in a vertical orientation. A SET button 111, located at the center of the rear electronic dial 110, is a push button that serves as an operation member for the user to confirm selected items or perform similar actions.

A video button 112 is an operation member that the user operates to start and stop video recording. A first button group 113 is an operation member related to focus and exposure, and includes the AF start button, AE lock button, and AF frame selection button. By pressing a button included in the first button group 113 while in the imaging standby state, the user can start AF, change the AF frame, or lock the exposure.

A second button group 114 includes the zoom in/out button, the information display button, and the quick settings button. By operating the zoom in/out button in live view mode during imaging, the user can toggle the zoom of the live view image on and off. Additionally, in playback mode, by operating the zoom in/out button, the user can toggle the zoom of the playback image on and off. By operating the information display button, the user can switch the display method of the information shown on the rear display unit 101. By operating the quick settings button, the user can transition the display on the rear display unit 101 to the screen for changing imaging parameters.

A third button group 115 includes the playback button and the delete button. By operating the playback button, the user can switch between imaging mode and playback mode. When the playback button is operated in imaging mode, the camera transitions to playback mode, displaying the most recent captured image stored on the media (not illustrated) on the rear display unit 101. In playback mode, when the user selects a captured image and operates the delete button, the selected image can be deleted.

A fourth button group 116 includes the menu button and the rating button. By operating the menu button, the user can display a menu screen on the rear display unit 101 showing configurable items. The user can intuitively select items and change settings by touching the menu screen displayed on the rear display unit 101 or by operating the multi-controller 109, rear electronic dial 110, and SET button 111. In playback mode, by operating the rating button, the user can assign a rating to the playback image.

A mount section 117 is configured to allow the mounting and removal of an interchangeable lens (not illustrated) equipped with an imaging optical system. A communication terminal 118 is provided inside the mount section 117 and is used for communication between the camera body 100 and the interchangeable lens.

A viewfinder 119 is an electronic viewfinder provided at the upper rear of the camera body 100. By looking through the viewfinder 119, the user can view the live view image and other displayed images. An eyepiece cover 120 is a rubber component that contacts the user's face around the eyes when looking through the viewfinder 119.

A grip section 121 is a handle component with a shape that allows the user to easily grip the camera body 100 with their right hand.

A card cover 122 is a cover for a media slot 153, which stores the media (not illustrated), and is located where the user's palm would contact the grip section 121.

A tripod socket 123 is an attachment component provided on the bottom of the camera body 100, used for mounting external accessories, such as an external cooling accessory 200, which can be attached and detached from the camera body 100, as described later.

A battery cover 124 is a cover for storing the battery (not illustrated) and is detachably mounted to a bottom exterior member 132.

A rear exterior member (first exterior member) 125 is an exterior member that forms the rear (first surface) of the camera body 100's housing and is molded from materials such as metal or polycarbonate. The rear exterior member 125 includes a main body inlet port (first opening) **125*a* provided on the bottom side of the camera body 100 and a storage appearance surface (storage surface) 125*ba*, which is part of the rear of the camera body 100 and houses the rear display unit 101**.

A side exterior member (second exterior member) 126 is an exterior member that forms the left side (second surface) of the camera body 100's housing when viewed from the rear of the camera body 100 and is molded from materials such as metal or polycarbonate. The side exterior member 126 includes a main body exhaust port **126*a***.

The bottom exterior member 132 is an exterior member that forms the bottom of the camera body 100's housing and is molded from materials such as metal or polycarbonate.

Figure 2A:
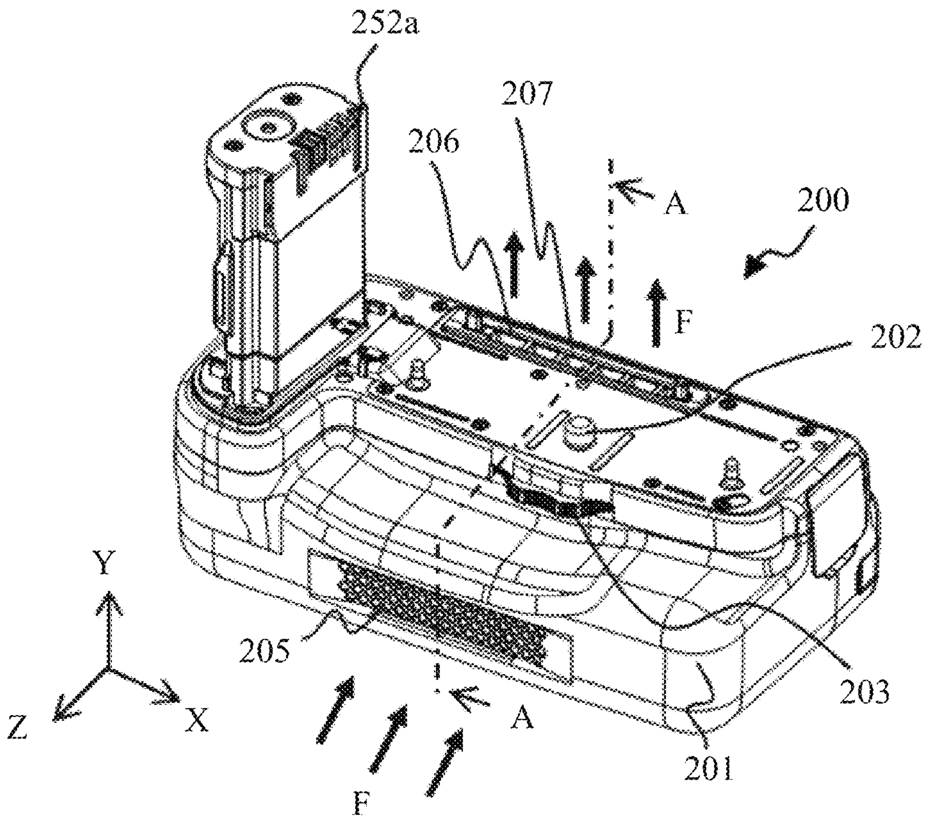
FIGS. 2A and 2B are explanatory diagrams of an external cooling accessory.
Figure 2B:
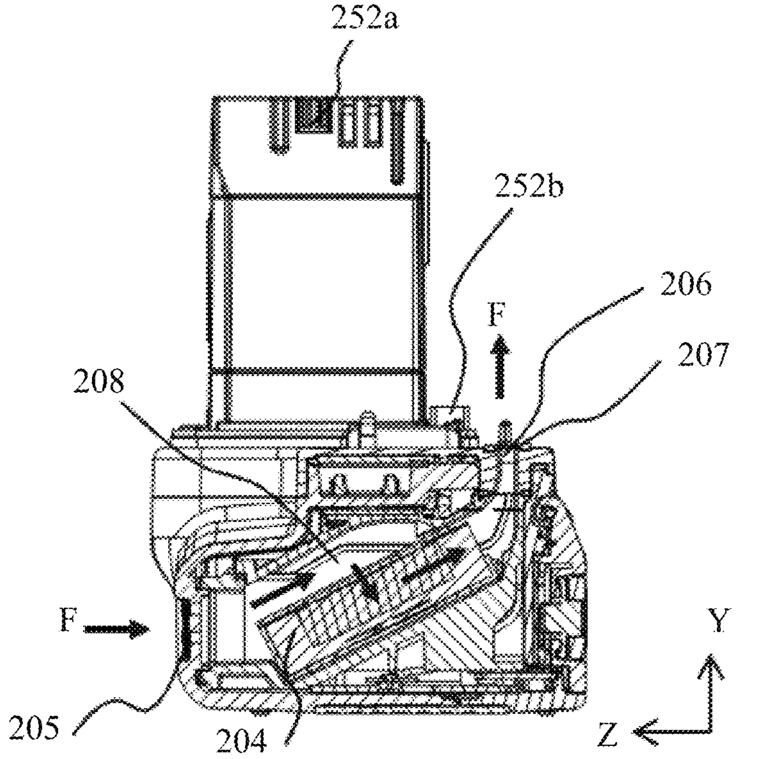

FIGS. 2A and 2B are explanatory diagrams of the external cooling accessory (cooling apparatus) 200, which is detachable from the camera body 100. FIG. 2A is a front perspective view of the external cooling accessory 200, and FIG. 2B is a cross-sectional view along line A-A of FIG. 2A.

The external cooling accessory 200 includes an accessory exterior 201, tripod screw 202, tripod screw operation section 203, fan (fan unit) 204, accessory inlet port 205, accessory exhaust port 206, and accessory cushion member (third sealant) 207. By operating the tripod screw operation section 203 and rotating the tripod screw 202, the camera body 100 and the external cooling accessory 200 can be secured together. The accessory cushion member 207 is provided on the upper surface of the accessory exhaust port 206.

By driving the fan 204, a second duct (second flow path) 208 is formed inside the external cooling accessory 200, extending from the accessory inlet port 205, illustrated by arrow F, through the fan 204 to the accessory exhaust port 206. A removable battery (not illustrated) is installed inside the external cooling accessory 200. The external cooling accessory 200 is equipped with a power terminal **252*a* and a communication terminal 252*b*. The power terminal 252*a* enables power supply between the camera body 100 and the external cooling accessory 200. The communication terminal 252*b* allows communication between the camera body 100 and the external cooling accessory 200**.

Figure 3A:
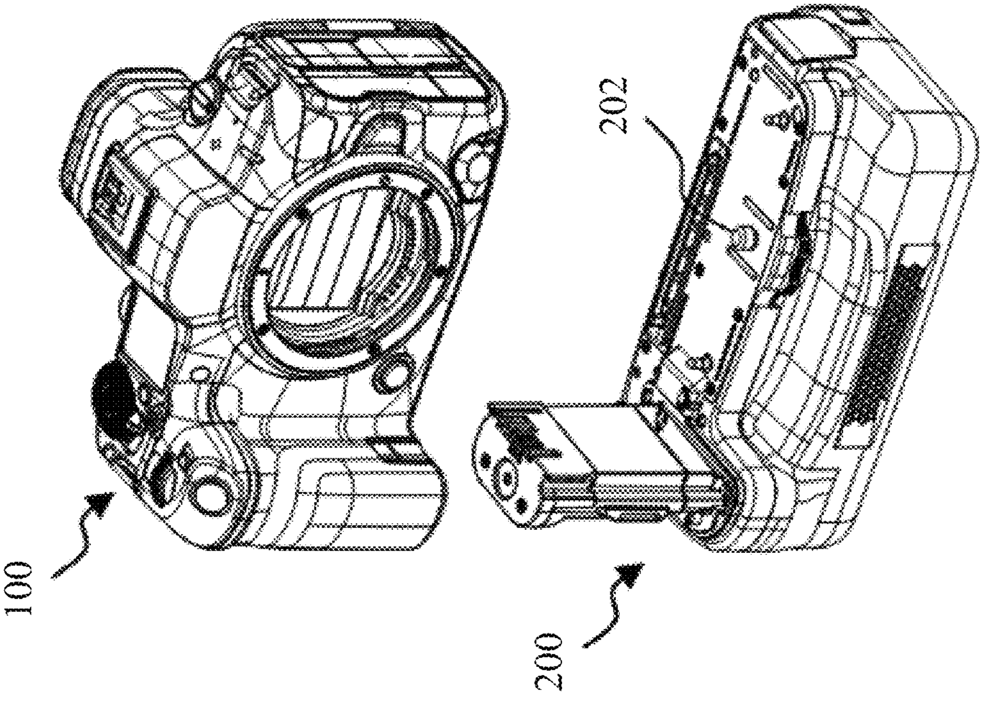
FIGS. 3A and 3B are external views of a camera body and the external cooling accessory.
Figure 3B:
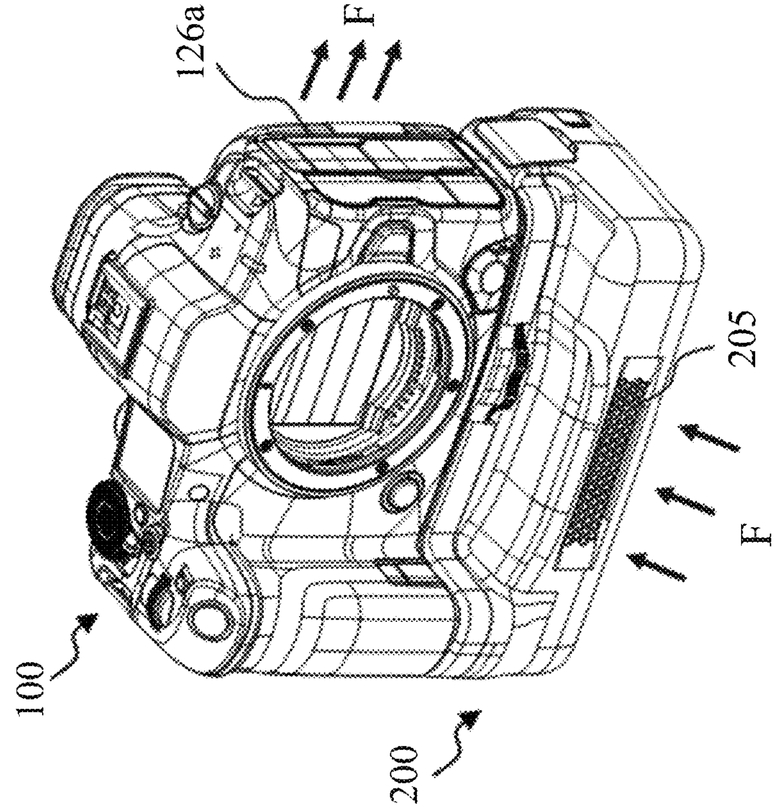

FIGS. 3A and 3B are external views of the camera body 100 and the external cooling accessory 200. FIG. 3A illustrates the camera body 100 viewed from the front when the external cooling accessory 200 is not attached. FIG. 3B illustrates the camera body 100 as part of a camera system, including the external cooling accessory 200 when attached, viewed from the front.

The state illustrated in FIG. 3A is used when cooling inside the camera body 100 is not required. Since the external cooling accessory 200 is not required, it offers the advantage of improved portability for users who do not need internal cooling of the camera body 100.

The external cooling accessory 200 is secured by removing the battery cover 124 from the camera body 100 and engaging the tripod socket 123 with the tripod screw 202. When the fan 204 is operated, a flow path is formed from the accessory inlet port 205 to the main body exhaust port 126*a*, as illustrated by arrow F. This allows for cooling of the heat inside the camera body 100 while the fan 204 is operating.

As described above, the external cooling accessory 200 should only be attached to the camera body 100 when internal cooling is necessary. By providing the option to attach or detach the external cooling accessory 200 based on the user's needs, it is possible to balance the portability of the camera body 100 with the cooling performance when required.

Figure 4A:
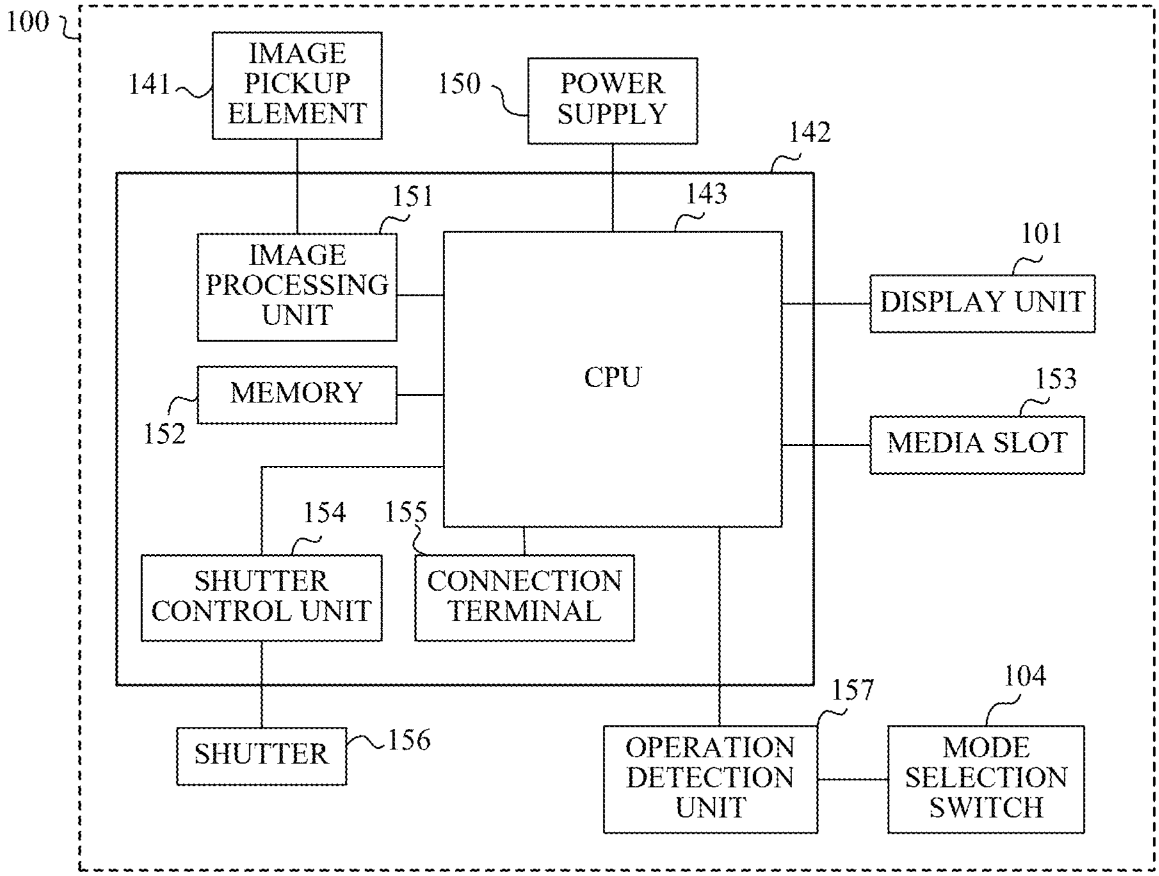
FIGS. 4A and 4B are system diagrams of the camera body and the external cooling accessory.
Figure 4B:
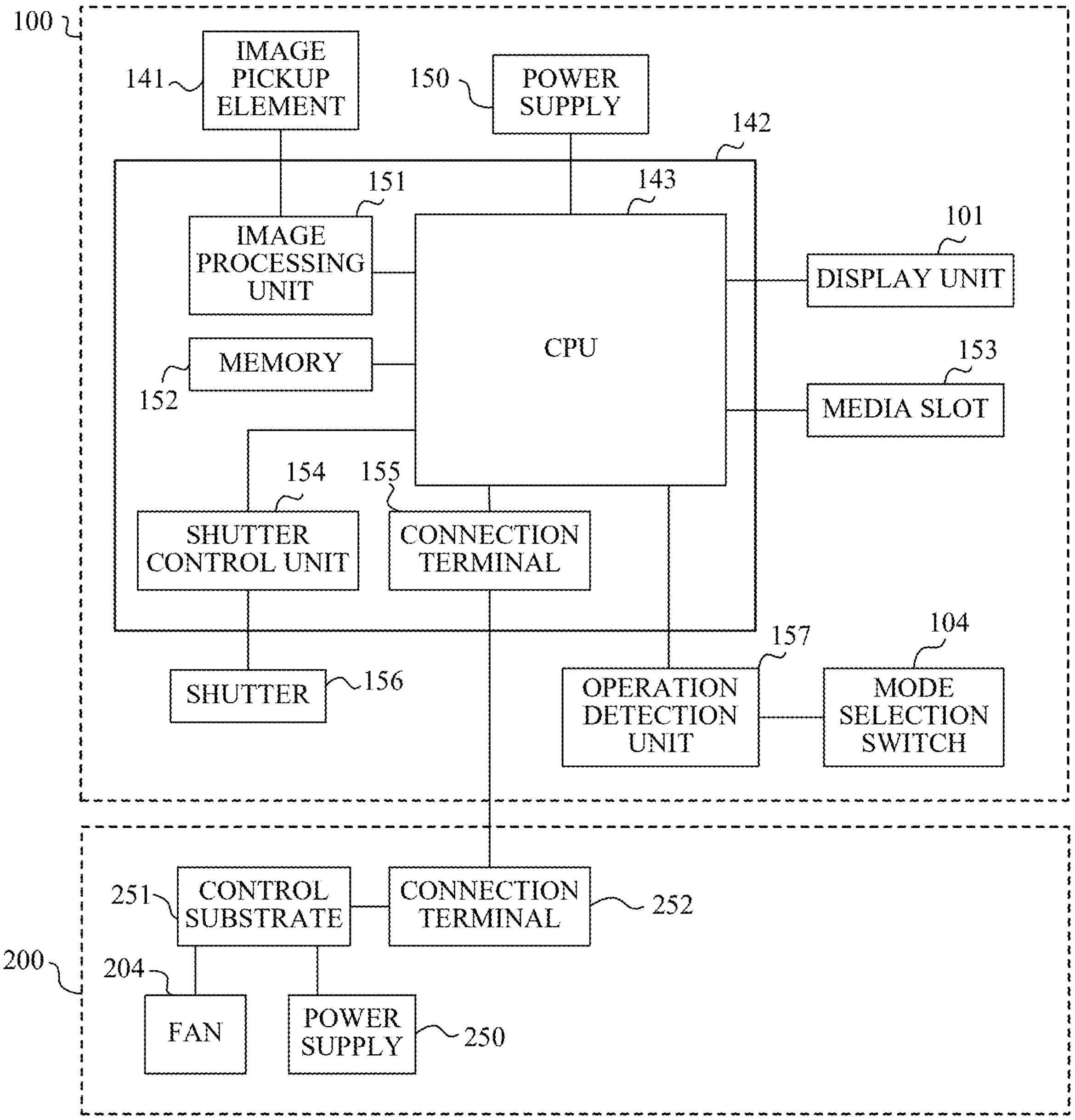

FIGS. 4A and 4B are system diagrams of the camera body 100 and the external cooling accessory 200. FIG. 4A is a system diagram of the camera body 100 in the state illustrated in FIG. 3A, and FIG. 4B is a system diagram of the camera body 100 and the external cooling accessory 200 in the state illustrated in FIG. 3B.

A main circuit board 142 is a printed wiring board (PWB) on which various components, including a CPU 143, a heat generating member, are mounted. The CPU 143 performs overall operation control of the camera body 100, executing control of each functional block and performing necessary calculations based on the computer program loaded from a memory 152. A power supply 150 provides electrical power to each circuit within the camera body 100. An image pickup element 141, which is made up of a CCD or CMOS sensor, converts the optical image of the subject into a photoelectric signal and outputs an image signal. The image signal output from the image pickup element 141 is converted into image data by an image processing unit 151 and output to the CPU 143. A shutter 156 is arranged in front of the image pickup element 141 and adjusts the exposure time of the image pickup element 141. A shutter control unit 154 drives the shutter 156 based on signals input from the CPU 143. An operation detection unit 157 outputs a signal to the CPU 143 when the mode selection switch 104 is operated by the user, changing the shooting conditions such as exposure and shutter speed.

The user can select a desired video recording mode from a plurality of multiple video recording modes by operating the mode selection switch 104. Video recording modes include, for example, high-quality mode and low-quality mode. In low-quality mode, the calorific value of electronic components such as the image pickup element 141 and CPU 143 is small, allowing for longer video recording times. On the other hand, in high-quality mode, the processing load on components like the image pickup element 141 and CPU 143 is large, resulting in a higher calorific value for the electronic components and the media (not illustrated). When the calorific value becomes large and exceeds the allowable temperature, it can cause thermal runaway or a reduction in product lifespan, forcing the video recording time to be shortened. In such cases, the external cooling accessory 200 can be attached to the camera body 100.

The external cooling accessory 200 is equipped with a power supply 250, a control substrate 251, and a connection terminal 252, and is connected to the camera body 100 for power supply and communication via the connection terminal 252 and a connection terminal 155 provided on the camera body 100. The power supply 250 supplies power to each circuit in the camera body 100 through the connection terminal 252. The control substrate 251 drives the fan 204 based on signals input from the CPU 143.

Figure 5A:
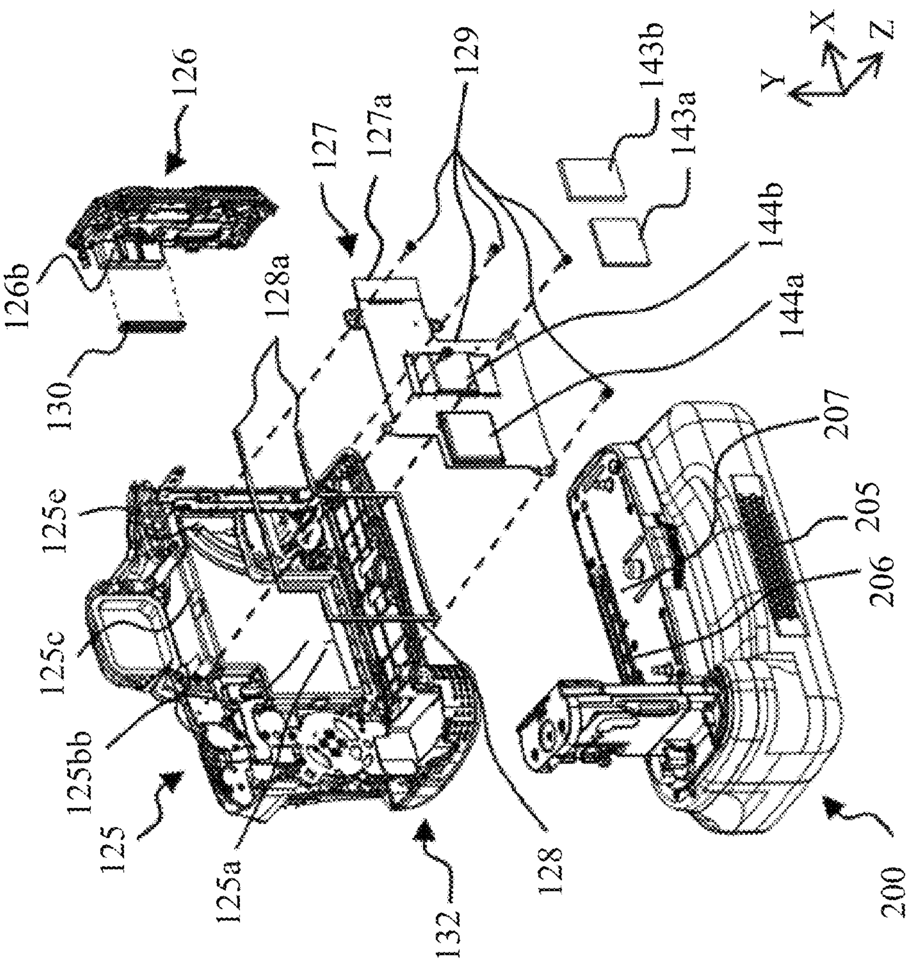
FIGS. 5A to 5D are explanatory diagrams of the interior of the camera body.
Figure 5B:
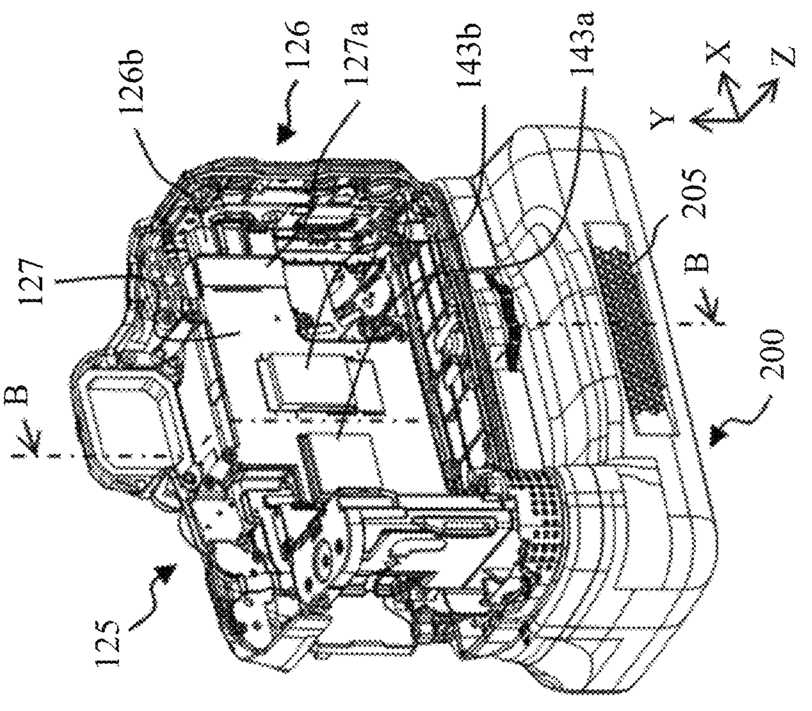
Figure 5C:
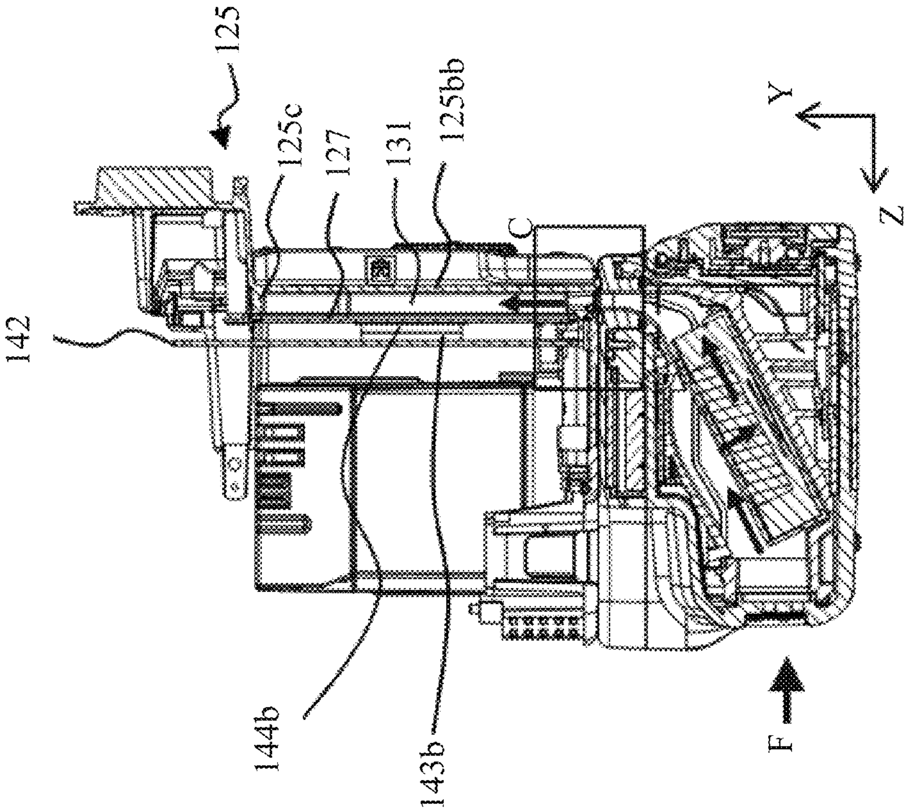
Figure 5D:
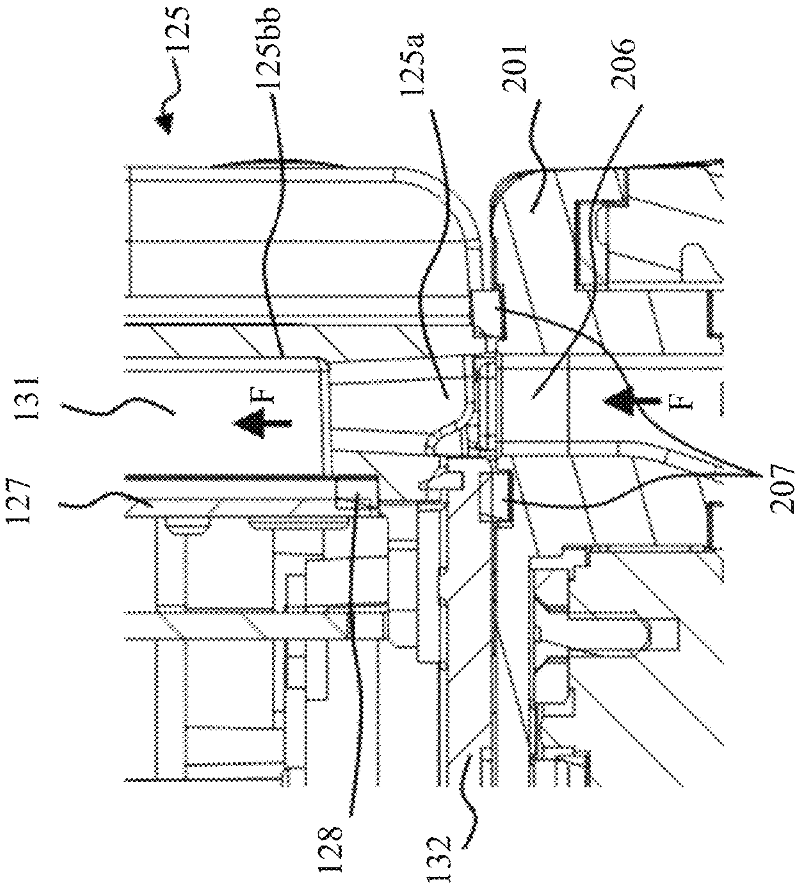

The internal configuration and cooling method of the camera body 100 are explained below. FIGS. 5A to 5D are explanatory diagrams of the interior of the camera body 100. FIG. 5A is an exploded perspective view of the interior of the camera body 100 viewed from the front when the external cooling accessory 200 is not attached. FIG. 5B is a perspective view of the interior of the camera body 100 viewed from the front when the external cooling accessory 200 is attached. FIG. 5C is a cross-sectional view along line B-B of FIG. 5B. FIG. 5D is an enlarged partial view of section C in FIG. 5C.

The rear exterior member 125 includes a storage inner surface 125*bb*, which is the backside of the storage appearance surface 125*ba*, and a wall section 125*c* formed to protrude in the Z-direction from the storage inner surface 125*bb*. A metal sheet member (heat radiating member) 127 is arranged inside the housing, facing the rear side of the camera body 100 (surface on the storage appearance surface 125*ba* side of the rear exterior member 125) and the opposite side (surface on the storage inner surface 125*bb* side of the rear exterior member 125). The metal sheet member 127 has an outer perimeter formed along the wall section 125*c* of the rear exterior member 125. In this embodiment, the metal sheet member 127 is assumed to be made of aluminum alloy, but this is not a limitation. A first cushion member (first sealant) 128 is arranged between the metal sheet member 127 and the wall section 125*c* and is applied to the wall section 125*c*. The metal sheet member 127 is fixed to the wall section 125*c* in the Z-direction through the first cushion member 128 by a fastening member 129.

A first CPU (second heat generating member) 143*a* and a second CPU (first heat generating member) 143*b* are arranged on the metal sheet member 127 side of the main circuit board 142 in the Z-direction. The first CPU 143*a* and the second CPU 143*b* have different calorific values. In this embodiment, the first CPU 143*a* has a smaller calorific value than the second CPU 143*b*. A first heat radiating member (second heat radiating member) 144*a* is arranged between the metal sheet member 127 and the first CPU 143*a*, and a second heat radiating member (first heat radiating member) 144*b* is arranged between the metal sheet member 127 and the second CPU 143*b*. The first heat radiating member 144*a* is thermally in contact with the first CPU 143*a* and transfers heat emitted from the first CPU 143*a* to the metal sheet member 127. The second heat radiating member 144*b* is thermally in contact with the second CPU 143*b* and transfers heat emitted from the second CPU 143*b* to the metal sheet member 127. In this embodiment, the first heat radiating member 144*a* is assumed to be made of thermal conductive rubber, and the second heat radiating member 144*b* is assumed to be a graphite sheet, but this is not a limitation. The side exterior member 126 includes a protruding section 126*b* that projects in the X-direction from the rear surface of the surface where the main body exhaust port 126*a* is provided. A second cushion member (second sealant) 130 is applied to the tip surface of the protruding section 126*b*.

In this embodiment, by dividing the main body inlet port 125*a* into the rear exterior member 125 and the main body exhaust port 126*a* into the side exterior member 126, the size increase of the rear exterior member 125 can be suppressed. As a result, it is possible to reduce the weight of the camera body 100. Additionally, by forming the main body inlet port 125*a* and the main body exhaust port 126*a* in separate exterior members, the freedom in positioning the main body inlet port 125*a* and main body exhaust port 126*a* is increased.

In this embodiment, the main body inlet port 125*a* is provided on the bottom surface, which has fewer operation members, as described in FIGS. 1A and 1B, compared to the top and rear surfaces, and the main body exhaust port 126*a* is provided on the left side surface when viewed from the rear of the camera body 100. This allows the user to operate the camera body 100 without blocking the main body inlet port 125*a* or the main body exhaust port 126*a*.

The thickness of the first cushion member 128 is greater than the clearance in the Z-direction between the wall section 125*c* and the metal sheet member 127. As a result, when the metal sheet member 127 is secured to the wall section 125*c* by the fastening member 129, the first cushion member 128 is always pressed in the Z-direction. With this configuration, a first duct (first flow path) 131 is formed in the camera body 100, extending from the main body inlet port 125*a* to a merging section 127*a* via the outer peripheral shape of the metal sheet member 127. The first duct 131 ensures internal sealing by pressing the first cushion member 128 and the second cushion member 130.

The accessory cushion member 207 is arranged to overlap with the outer periphery of the main body inlet port 125*a* in the Y-direction. The thickness of the accessory cushion member 207 is greater than the clearance in the Y-direction between the accessory exterior 201 and the rear exterior member 125 as well as the bottom exterior member 132. As a result, when the external cooling accessory 200 is attached to the camera body 100, the accessory cushion member 207 is always pressed in the Y-direction. With this configuration, it becomes possible to ensure sealing from the accessory exhaust port 206 to the main body inlet port 125*a* during the operation of the fan 204 and to form the flow path illustrated by arrow F in the figure, extending from the accessory inlet port 205 to the first duct 131. To sufficiently secure this flow path, the clearance in the Z-direction between the storage inner surface 125*bb* and the metal sheet member 127, which constitutes the first duct 131, is made greater than the thickness of the metal sheet member 127.

The heat generated by the first CPU 143*a* and the second CPU 143*b* is transferred to the metal sheet member 127 via the first heat radiating member 144*a* and the second heat radiating member 144*b*, respectively. The heat of the metal sheet member 127 is cooled by the air flowing from the accessory inlet port 205 to the first duct 131. In shooting modes where the heat sources of the camera body 100, including the first CPU 143*a* and the second CPU 143*b*, have low calorific value, the external cooling accessory 200 is not attached. On the other hand, in shooting modes with high calorific value, a camera system is configured by attaching the external cooling accessory 200 and driving the fan 204. This configuration ensures the portability of the camera body 100 while improving heat dissipation and providing users with greater flexibility in operation.

Figure 6A:
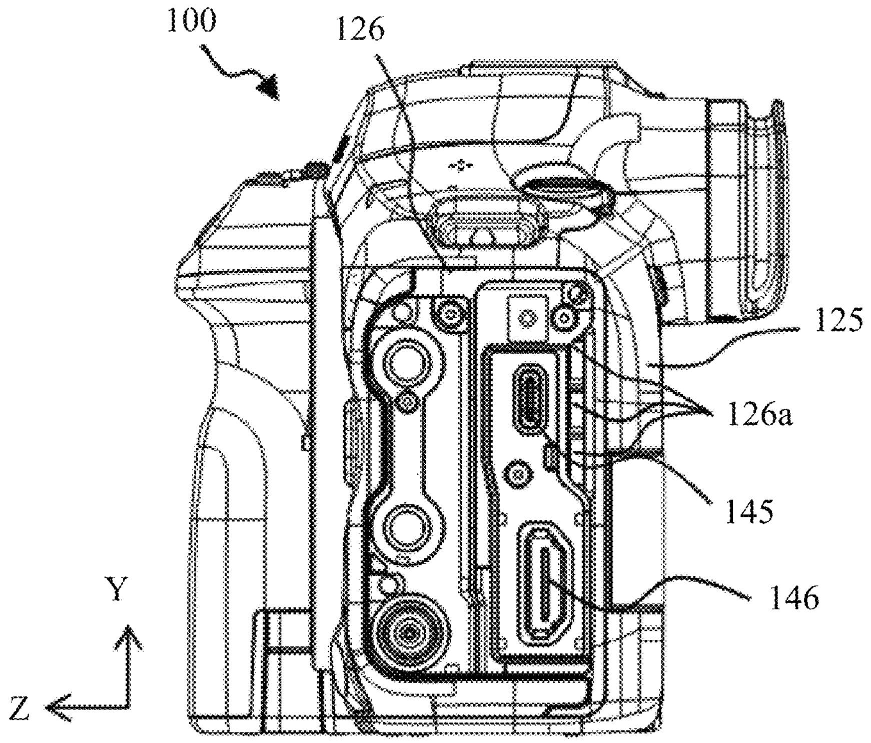
FIGS. 6A and 6B are side views of the camera body.
Figure 6B:
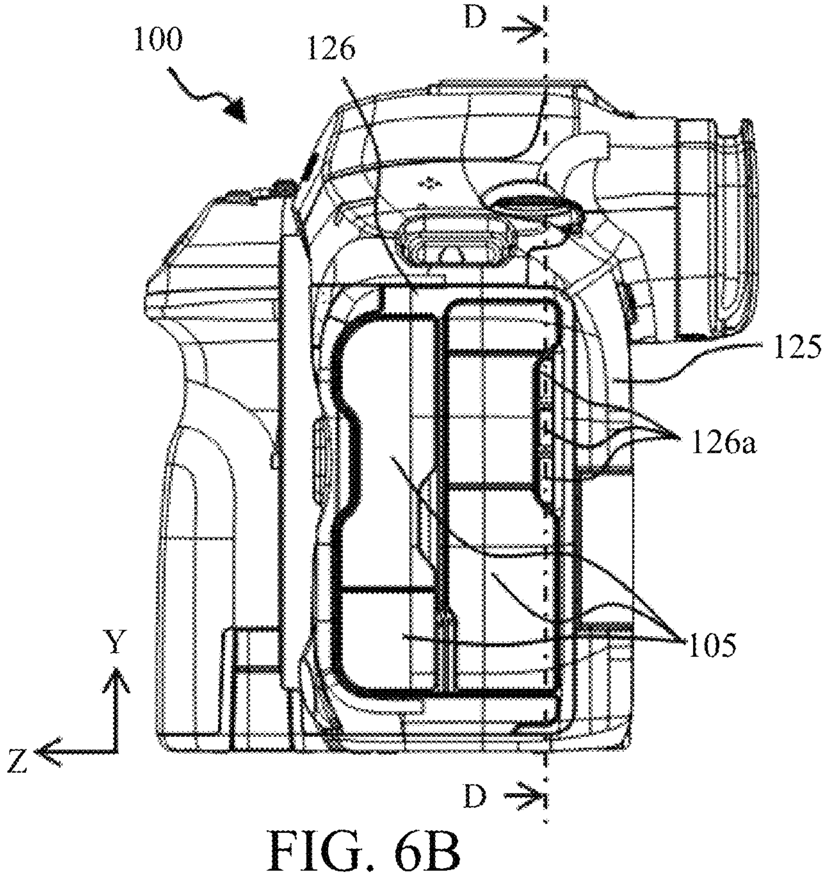

FIGS. 6A and 6B are side views of the camera body 100. FIG. 6A illustrates the state with the terminal cover 105 removed. FIG. 6B illustrates the state with the terminal cover 105 attached.

The camera body 100 includes a USB terminal (first connector) 145 and an HDMI® terminal (second connector) 146. The USB terminal 145 and the HDMI terminal 146 are arranged to be exposed through an opening in the side exterior member 126. The USB terminal 145 and the HDMI terminal 146 are protected by the terminal cover 105 when not in use. In this embodiment, the HDMI terminal 146 has a larger area (projected area) on the side exterior member 126 compared to the USB terminal 145. The main body exhaust port 126*a* is arranged rearward in the Z direction of the USB terminal 145 and upward in the Y direction of the HDMI terminal 146. By utilizing the space created by the difference in area between the USB terminal 145 and the HDMI terminal 146 to position the main body exhaust port 126*a*, it is possible to prevent the terminal cover 105 from expanding rearward in the Z direction and to reduce the size and weight of the camera body 100 in the Z. The USB terminal 145 and the HDMI terminal 146 may be mounted on the main circuit board 142 or on an unillustrated circuit board arranged parallel to the main circuit board 142.

Figure 7A:
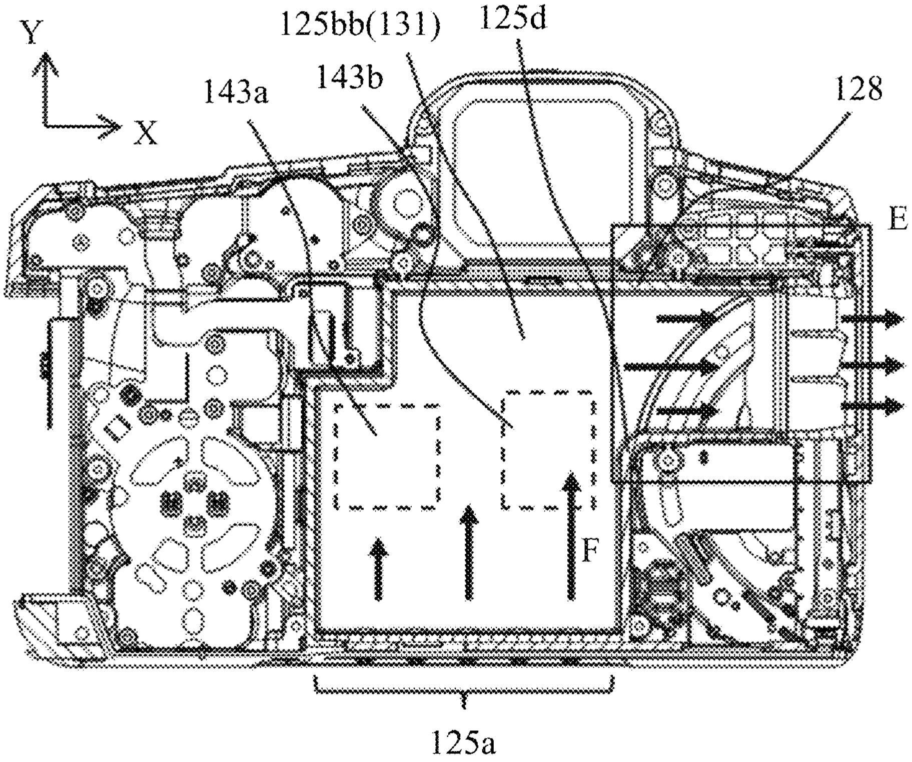
FIGS. 7A to 7C are internal views of the camera body.
Figure 7B:
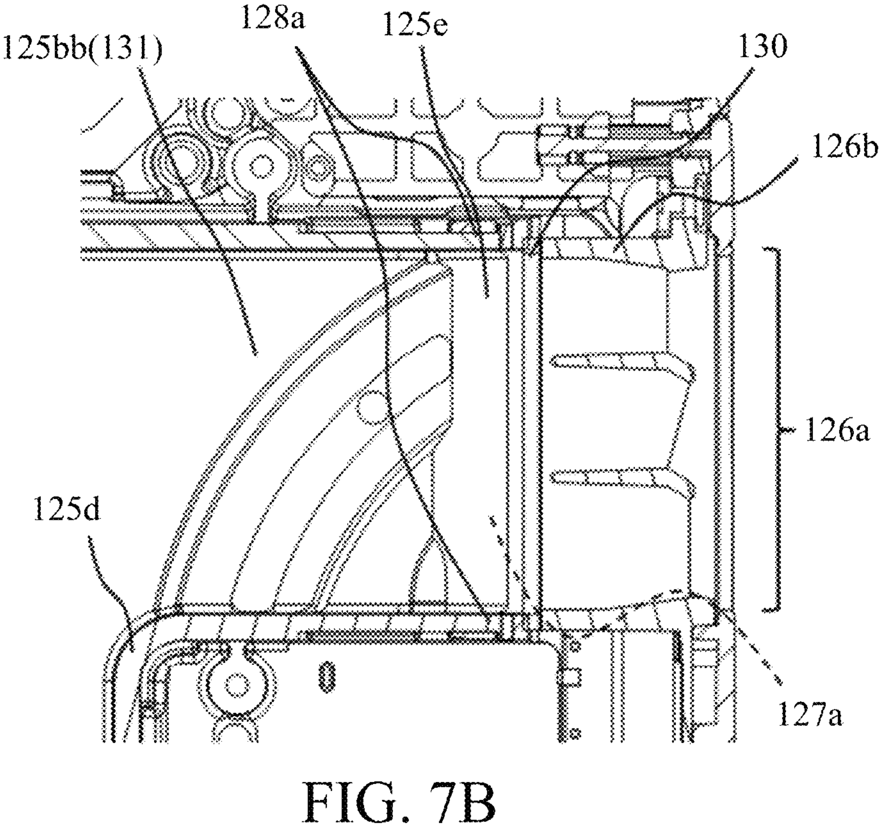
Figure 7C:
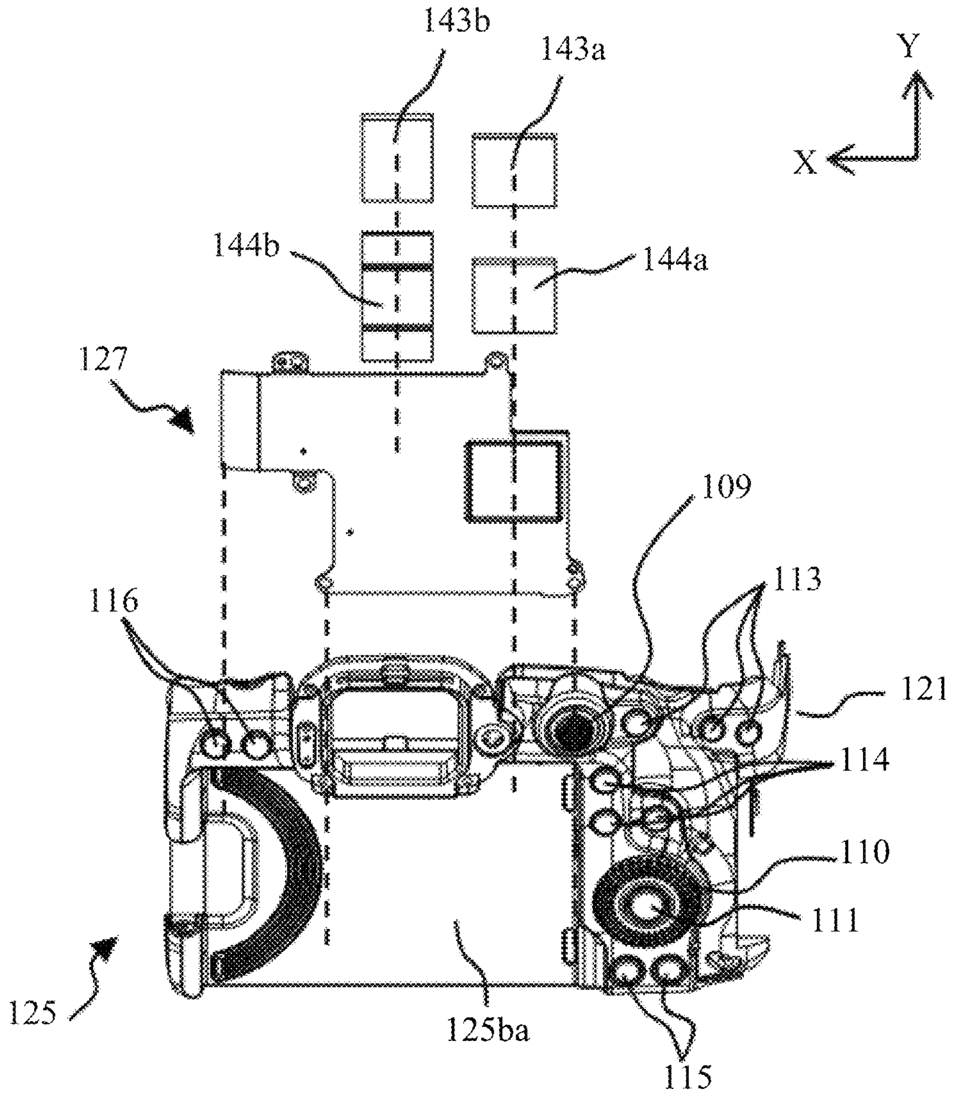

FIGS. 7A to 7C are internal views of the camera body 100. FIG. 7A is a cross-sectional view along line D-D of FIG. 6B. FIG. 7B is an enlarged view of section E in FIG. 7A. FIG. 7C is an exploded perspective view of the interior of the camera body 100 as viewed from the rear.

In this embodiment, the calorific value of the second CPU 143*b* is greater than that of the first CPU 143*a*. The wall section 125*c* forms the wall of the first duct 131 and includes a bent part 125*d* that forcibly redirects air entering from the main body inlet port 125*a* toward the main body exhaust port 126*a*. The second CPU 143*b* is arranged near the main body inlet port 125*a* side relative to the bent part 125*d*. Generally, the pressure is higher on the outer side of a flow path and lower on the inner side, resulting in higher flow velocity on the inner side and lower flow velocity on the outer side. Inside the first duct 131, as illustrated by arrow F, a flow path is formed where the side near the second CPU 143*b* corresponds to the higher-velocity inner side, and the side near the first CPU 143*a* corresponds to the lower-velocity outer side. As described above, by increasing the flow velocity near the second CPU 143*b*, which has a higher calorific value, it is possible to efficiently enhance the heat dissipation of the second CPU 143*b* within the limited flow path.

The second cushion member 130 is arranged in the X direction between a merging section 125*e* of the rear exterior member 125 and the protruding section 126*b* of the side exterior member 126, between the merging section 127*a* of the metal sheet member 127 and the protruding section 126*b*, and between a merging section 128*a* of the first cushion member 128 and the protruding section 126*b*.

When the side exterior member 126 is attached to the camera body 100 in the X direction, the thickness of the second cushion member 130 is larger than the X-direction clearance between the protruding section 126*b* and the merging sections 125*e*, 127*a*, and 128*a*. As a result, when the side exterior member 126 is attached to the camera body 100 in the X direction, the second cushion member 130 is always pressed in the X direction. With this configuration, the sealing between the first duct 131 and the main body exhaust port 126*a* during the operation of the fan 204 is ensured, and as illustrated in FIG. 7A, a flow path illustrated by arrow F from the main body inlet port 125*a* to the main body exhaust port 126*a* is formed.

The multi-controller 109, rear electronic dial 110, SET button 111, buttons 113 to 116 (first to fourth), and grip section 121 are arranged in positions that do not overlap with the first duct 131 when viewed from the Z direction. Furthermore, the first CPU 143*a*, which has a smaller calorific value compared to the second CPU 143*b*, is arranged closer to the grip section 121. In this embodiment, the thermal conductivity of the first heat radiating member 144*a* is set to be smaller than that of the second heat radiating member 144*b*. In this way, the first CPU 143*a* and second CPU 143*b*, which are heat sources, as well as the metal sheet member 127 that receives their heat, are intentionally arranged away from the components that the user may touch, both in the X and Y directions.

With the above configuration, the heat dissipation of the first CPU 143*a* and the second CPU 143*b* through the airflow from the fan 204 can be performed efficiently, while preventing the rear exterior member 125 from becoming excessively hot in a short period.

While the disclosure has described example embodiments, it is to be understood that the disclosure is not limited to the example embodiments. The scope of the following claims is to be accorded the broadest interpretation so as to encompass all such modifications and equivalent structures and functions.

According to the present disclosure, it is possible to provide an image pickup apparatus that achieves both portability and cooling performance while enhancing the flexibility of inlet port and exhaust port placement.

This application claims priority to Japanese Patent Application No. 2024-031873, which was filed on Mar. 4, 2024, and which is hereby incorporated by reference herein in its entirety.

What is claimed is:

1. An image pickup apparatus to which a cooling apparatus including a fan unit is detachable, the image pickup apparatus comprising:
- a heat generating member;
- a first exterior member that forms a first surface of a housing and has a first opening;
- a second exterior member that forms a second surface different from the first surface of the housing and has a second opening;
- a heat radiating member that is arranged inside the housing to face a surface opposite to the first surface and is configured to cool heat generated by the heat generating member;
- a first sealant that is arranged between the first exterior member and the heat radiating member; and
- a second sealant that is arranged between the first exterior member and the second exterior member, and between the heat radiating member and the second exterior member,
- wherein the first exterior member, the second exterior member, and the heat radiating member form a first flow path of air between the first opening and the second opening,
- wherein the first sealant is arranged in a pressed state between the first exterior member and the heat radiating member, and
- wherein the second sealant is arranged in a pressed state between the first exterior member, the second exterior member, and the heat radiating member.

2. The image pickup apparatus according to claim 1,
- wherein the first surface is a rear surface of the image pickup apparatus, and
- wherein the second surface is a side surface of the image pickup apparatus.

3. The image pickup apparatus according to claim 1, further comprising:
- an image pickup element configured to photoelectrically convert an optical image of a subject; and
- a first connector and a second connector that are provided on the second surface and are configured to connect an external device,
- wherein the second connector is formed with a larger projected area than the first connector, and
- wherein the second opening is arranged to overlap the second connector in a direction perpendicular to an image pickup surface of the image pickup element.

4. The image pickup apparatus according to claim 1, wherein the cooling apparatus is detachable from a bottom surface of the image pickup apparatus.

5. The image pickup apparatus according to claim 1, further comprising:
- an image pickup element configured to photoelectrically convert an optical image of a subject;
- an operation member operated by a photographer; and
- a gripping member gripped by the photographer,
- wherein the operation member and the gripping member are arranged not to overlap the first flow path when viewed in a direction perpendicular to an image pickup surface of the image pickup element.

6. The image pickup apparatus according to claim 1, further comprising:
- a first heat generating member;
- a second heat generating member with a smaller calorific value than the first heat generating member;
- a first heat radiating member thermally in contact with the first heat generating member; and
- a second heat radiating member thermally in contact with the second heat generating member;
- wherein the first flow path is thermally in contact with the first heat radiating member and the second heat radiating member,
- wherein the first flow path includes a bent part, and
- wherein the first heat generating member is arranged closer to the bent part than the second heat generating member.

7. The image pickup apparatus according to claim 6, further comprising a gripping member gripped by a photographer,
- wherein the first heat generating member is arranged farther from the gripping member than the second heat generating member.

8. The image pickup apparatus according to claim 1, further comprising a display configured to display various types of information,
- wherein a part of the first surface has a storage surface formed to house the display, and
- wherein the first flow path is formed by a surface opposite to the storage surface, the second exterior member, and the heat radiating member.

9. A camera system comprising:
- an image pickup apparatus;
- a cooling apparatus that includes a fan unit and is detachable from the image pickup apparatus,
- wherein the image pickup apparatus includes:
  - a heat generating member;
  - a first exterior member that forms a first surface of a housing and has a first opening;
  - a second exterior member that forms a second surface different from the first surface of the housing and has a second opening;
  - a heat radiating member that is arranged inside the housing to face a surface opposite to the first surface and is configured to cool heat generated by the heat generating member;
  - a first sealant that is arranged between the first exterior member and the heat radiating member; and
  - a second sealant that is arranged between the first exterior member and the second exterior member, and between the heat radiating member and the second exterior member, wherein the first exterior member, the second exterior member, and the heat radiating member form a first flow path of air between the first opening and the second opening, wherein the first sealant is placed in a pressed state between the first exterior member and the heat radiating member, and wherein the second sealant is placed in a pressed state between the first exterior member, the second exterior member, and the heat radiating member.

10. The camera system according to claim 9, wherein the cooling apparatus includes a third opening formed on a third surface that faces a surface where the first opening is formed, a fourth opening formed on a fourth surface different from the third surface of the cooling apparatus, and a third sealant arranged around an outer periphery of the third opening, in a pressed state between the surface where the first opening is formed and the third surface.

11. The camera system according to claim 10, wherein, inside the cooling apparatus, a second flow path of air is formed from the fourth opening to the third opening via the fan unit, and wherein the first flow path and the second flow path are connected via the first opening and the third opening.

* * * * *